(12) United States Patent
Chang et al.

(10) Patent No.: US 12,513,414 B2
(45) Date of Patent: Dec. 30, 2025

(54) IMAGE ADJUSTING METHOD, ELECTRONIC DEVICE, AND NON-TRANSITORY COMPUTER READABLE STORAGE MEDIUM

(71) Applicant: HTC Corporation, Taoyuan (TW)

(72) Inventors: Chin-Yu Chang, Taoyuan (TW); Yun-Ting Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 128 days.

(21) Appl. No.: 18/508,190

(22) Filed: Nov. 13, 2023

(65) Prior Publication Data

US 2025/0159362 A1 May 15, 2025

(51) Int. Cl.
*H04N 23/76* (2023.01)
*G06T 5/77* (2024.01)
*H04N 5/262* (2006.01)
*H04N 23/71* (2023.01)

(52) U.S. Cl.
CPC ............... *H04N 23/76* (2023.01); *G06T 5/77* (2024.01); *H04N 5/2628* (2013.01); *H04N 23/71* (2023.01)

(58) Field of Classification Search
CPC ...... H04N 23/76; H04N 5/2628; H04N 23/71; G06T 5/77
See application file for complete search history.

(56) References Cited

U.S. PATENT DOCUMENTS 7,362,354 B2 4/2008 Lin
2020/0258201 A1* 8/2020 Cheng ...................... G06T 5/92

FOREIGN PATENT DOCUMENTS

CN 111340749 A 6/2020
TW 202130163 A 8/2021

OTHER PUBLICATIONS

The office action of the corresponding Taiwanese application No. TW113113175 issued on May 28, 2024.

* cited by examiner

*Primary Examiner* — Yogesh K Aggarwal
(74) *Attorney, Agent, or Firm* — CKC & Partners Co., LLC

(57) ABSTRACT

An image adjusting method, suitable for an electronic device is disclosed. The image adjusting method includes the following operations: calculating several patch brightness values of several patches of an image; adjusting a first patch brightness value of a first patch of several patches to generate a first adjusted patch when the first patch brightness value of the first patch is not within a target brightness value range, so that a first adjusted patch brightness value of the first adjusted patch is within the target brightness value range; and replacing the first patch of the image with the first adjusted patch to obtain an adjusted image.

17 Claims, 7 Drawing Sheets

IMAGE ADJUSTING METHOD, ELECTRONIC DEVICE, AND NON-TRANSITORY COMPUTER READABLE STORAGE MEDIUM

FIELD OF INVENTION

The present application relates to an image adjusting method, an electronic device, and a non-transitory computer readable storage medium. More particularly, the present application relates to an image adjusting method, an electronic device, and a non-transitory computer readable storage medium with a SLAM (simultaneous localization and mapping) system.

BACKGROUND

Most image adjusting methods controls the exposure and gain and applies the adjusted exposure and gain to the whole image. However, the image may include some bright part and dark part in the whole image. If the adjusted exposure and gain is applied to the whole image, the bright part of the adjusted image may become over-exposed and the details of the image may be lost. While the electronic device extracts the features from the adjusted image, the features that lie in the over-exposed part may be missed.

SUMMARY

The disclosure provides an image adjusting method. The image adjusting method is suitable for an electronic device. The image adjusting method includes the following operations: calculating several patch brightness values of several patches of an image; adjusting a first patch brightness value of a first patch of several patches to generate a first adjusted patch when the first patch brightness value of the first patch is not within a target brightness value range, so that a first adjusted patch brightness value of the first adjusted patch is within the target brightness value range; and replacing the first patch of the image with the first adjusted patch to obtain an adjusted image.

The disclosure provides an electronic device. The electronic device includes a camera and a processor. The camera is configured to capture an image of a real space. The processor is coupled to the camera, and the processor is configured to: calculate several patch brightness values of several patches of an image; adjust a first patch brightness value of a first patch of several patches to generate a first adjusted patch when the first patch brightness value of the first patch is not within a target brightness value range, so that a first adjusted patch brightness value of the first adjusted patch is within the target brightness value range; and replace the first patch of the image with the first adjusted patch to obtain an adjusted image.

The disclosure provides a non-transitory computer readable storage medium with a computer program to execute aforesaid image adjusting method.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
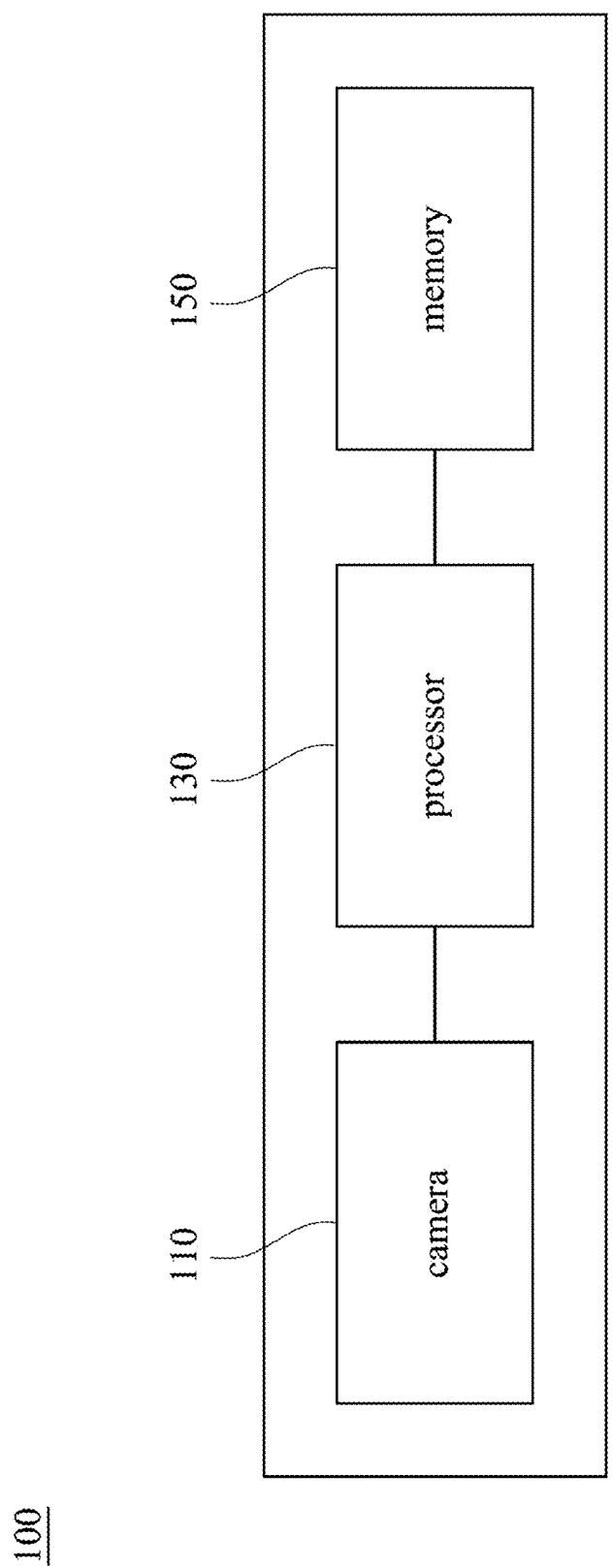
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

Reference is made to FIG. 1. FIG. 1 is a schematic block diagram illustrating an electronic device 100 in accordance with some embodiments of the present disclosure. In some embodiments, the electronic device 100 may be configured to perform a SLAM system. The SLAM system includes operations such as image capturing, features extracting from the image, and localizing according to the features. The details of the SLAM system will not be described herein.

Specifically, in some embodiments, the electronic device 100 may be applied in a virtual reality (VR)/mixed reality (MR)/augmented reality (AR) system. For example, the electronic device 100 may be realized by, a standalone head mounted device (HMD) or VIVE HMD or a tracking device (self-tracking device). In detail, the standalone HMD or VIVE HMD or tracking device may handle such as processing location data of position and rotation, graph processing or others data calculation.

As shown in FIG. 1, the electronic device 100 includes a camera 110, a processor 130, and a memory 150. One or more programs are stored in the memory 150 and configured to be executed by the processor 130, in order to perform the image adjusting method.

The processor 130 is electrically connected to the camera 110 and the memory 150. In some embodiments, the processor 130 can be realized by, for example, one or more processing circuits, such as central processing circuits and/ or micro processing circuits, but are not limited in this regard. In some embodiments, the memory 150 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

The camera 110 is configured to capture one or more images of the real space that the electronic device 100 is operated. In some embodiments, the camera 110 may be realized by a camera circuit device or any other camera circuit with image capture functions. It is noted that, the embodiments shown in FIG. 1 is merely an example and not meant to limit the present disclosure.

Figure 2:
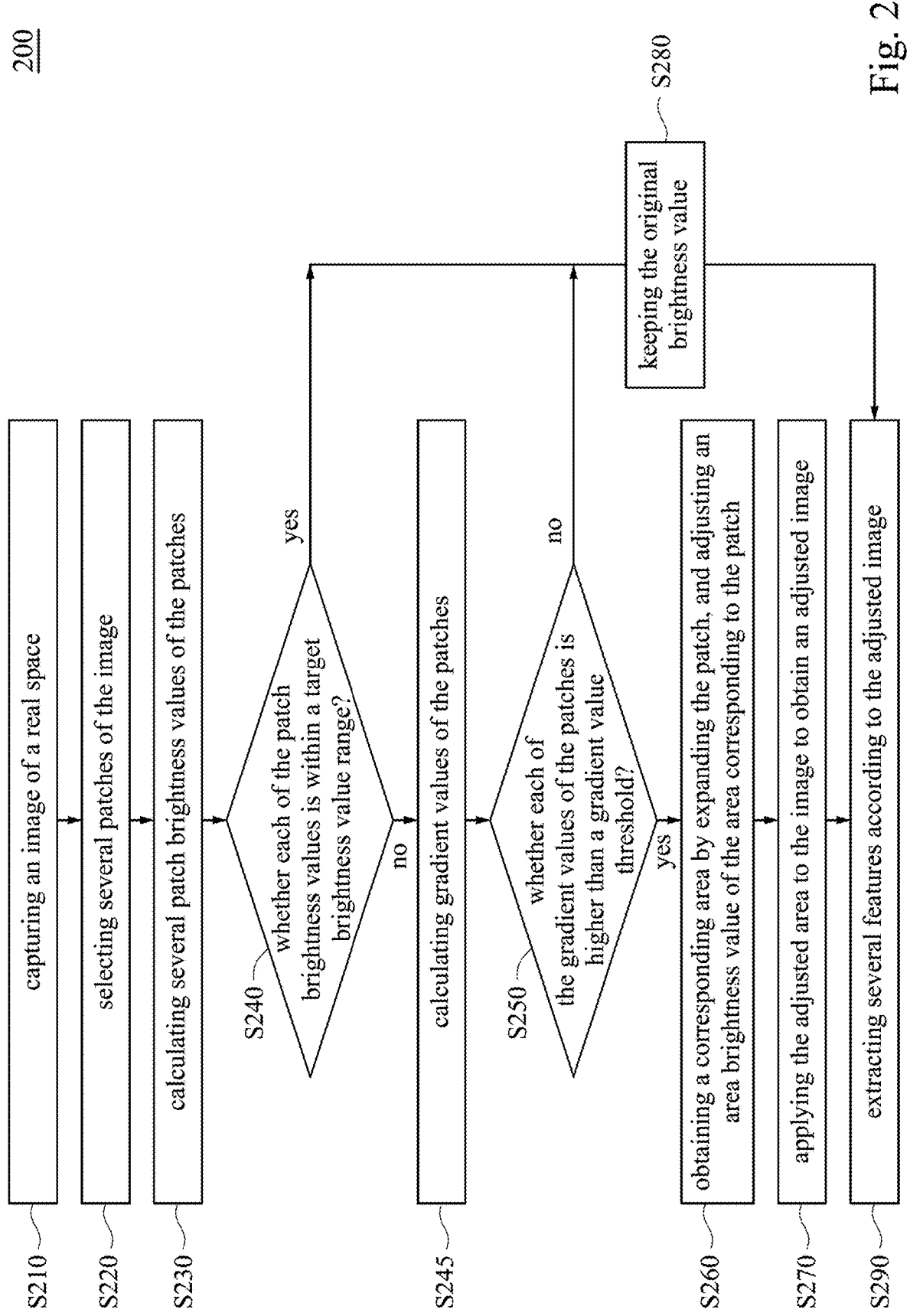
FIG. 2 is a flowchart illustrating an image adjusting method in accordance with some embodiments of the present disclosure.

Reference is made to FIG. 2. For better understanding of the present disclosure, the detailed operation of the electronic device 100 will be discussed in accompanying with the embodiments shown in FIG. 2. FIG. 2 is a flowchart illustrating the image adjusting method 200 in accordance with some embodiments of the present disclosure. It should be noted that the image adjusting method 200 can be applied to an electrical device having a structure that is the same as or similar to the structure of the electronic device 100 shown in FIG. 1. To simplify the description below, the embodiments shown in FIG. 1 will be used as an example to describe the image adjusting method 200 according to some embodiments of the present disclosure. However, the present disclosure is not limited to application to the embodiments shown in FIG. 1. As shown in FIG. 2, the image adjusting method 200 includes operations S210 to S290.

In operation S210, an image of a real space is captured. Reference is made to FIG. 1 together. In some embodiments, the camera 110 captures an image. The image is then transmitting to the processor 130.

In operation S220, several patches of the image are selected. In some embodiments, operation S220 is operated by the processor 130 in FIG. 1.

Figure 3:
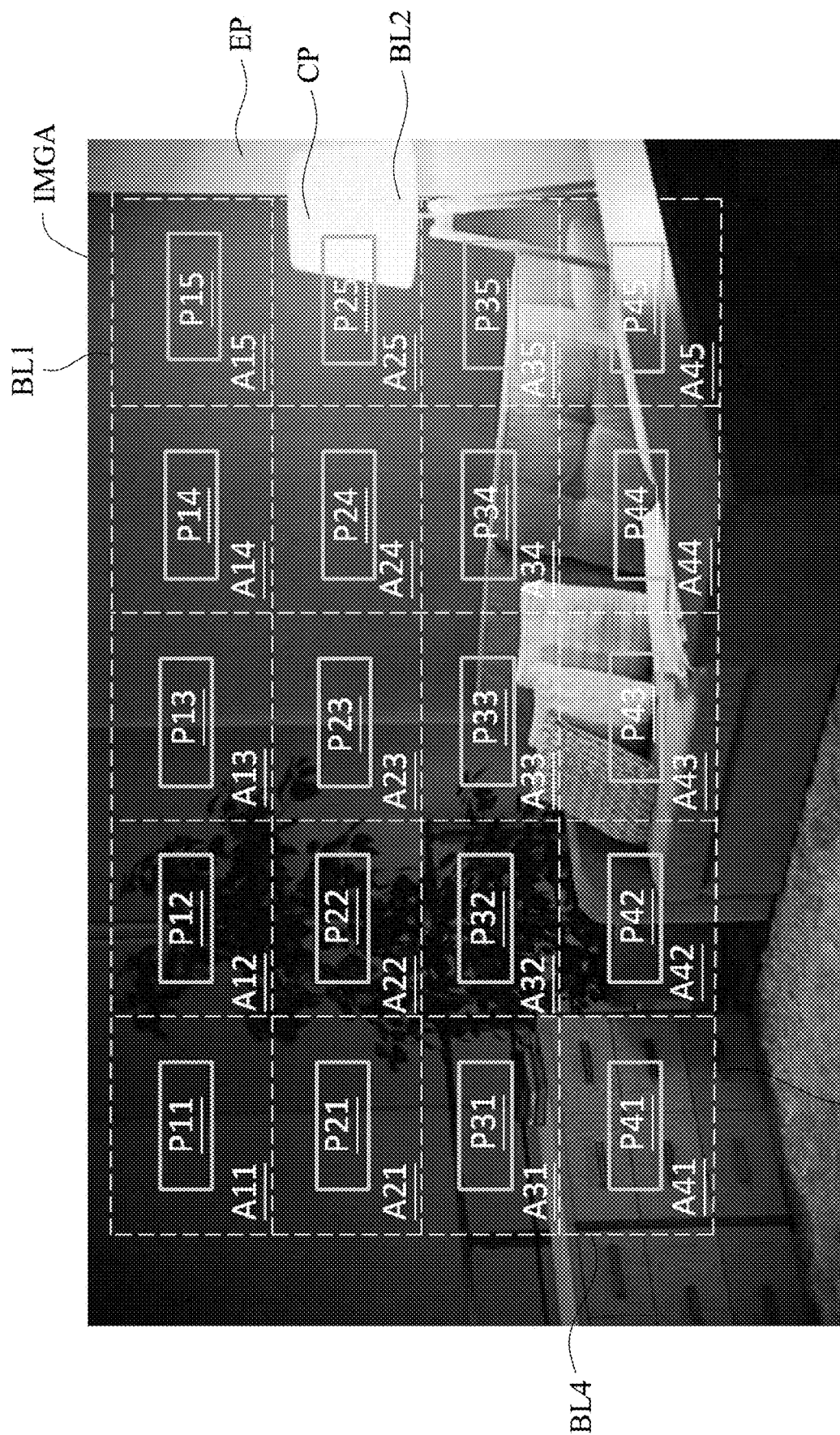
FIG. 3 is a schematic diagram illustrating an operation of the image adjusting method according to some embodiments of the present disclosure.

Reference is made to FIG. 3 together. FIG. 3 is a schematic diagram illustrating an operation of the image adjusting method 200 according to some embodiments of the present disclosure.

The image IMGA in FIG. 3 is the original image captured by the camera 110. As illustrated in FIG. 3, the image IMGA includes several patches P11 to P45. The patches P11 to P45 are selected by the processor 130.

The patches P11 to P45 are dispersed within the image IMGA, and the number and location of the patches P11 to P45 as illustrated in FIG. 3 are for illustrative purposes only, and the embodiments of the present disclosure are not limited thereto.

In some embodiments, the patches located only at the center part CP of the image IMGA instead of the edge part EP of the IMGA. Since the edge part EP of the image IMGA includes image distortion and will not be used during feature extraction.

The definition of the edge part EP and the center part CP depends on the distortion of the image IMGA. In the embodiment of FIG. 3, the center part CP is the portion of the image IMGA within the board lines BL1 to BL4, and the edge part EP is the portion of the image IMGA out of the board lines BL1 to BL4.

In some embodiments, the number of the patches P11 to P45 depends on the resolution of the image IMGA and is proportional to the resolution of the image IMGA. In some embodiments, the number of the patches P11 to P45 is defined by the processor 130 before operation the image adjusting method 200.

In operation S230, several patch brightness values of the patches are calculated. In some embodiments, operation S230 is operated by the processor 130 in FIG. 1.

In some embodiments, in operation S230, the processor 130 calculates the patch brightness value of each of the patches P11 to P45. In some embodiments, the processor 130 calculates the patch brightness value of each of the patches P11 by P45 by sampling the pixels of each of the patches P11 to P45 to obtain the patch brightness value of each of the patches P11 to P45.

Take the patch P11 for example, in some embodiments, the processor 130 selects several pixels of the patch P11, and the processor 130 calculates an average brightness value according to the brightness values of the selected pixels. The average brightness value is taken as the patch brightness value of the patch P11.

In some embodiments of the present disclosure, the patch brightness value indicates an average brightness value of the pixels of the patch, and the area brightness value indicates an average brightness value of the pixels of the area.

Reference is made to FIG. 3 again, in some embodiments, the image IMGA is divided into several areas. In some embodiments, only the center part CP of the image IMGA is divided into several areas A11 to A45, as illustrated in FIG. 3.

As illustrated in FIG. 3, the areas A11 to A45 do not overlap each other. Each of the patches P11 to P45 corresponds to one of the areas A11 to A45. That is, each of the areas A11 to A45 includes one of the patches P11 to P45. The areas A11 to A45 are expanded from the patches P11 to P45 and are larger than the patches P11 to P45.

In some other embodiments, the patches P11 to P45 are as large as the areas A11 to A15 in correspondence. It should be noted that, any size of the areas A11 to A45 expanded from the patches P11 to P45 in correspondence are within the embodiments of the present disclosure.

In some embodiments, in operation S230, after calculating the patch brightness values of the patches P11 to P45, the patch brightness values of the patches P11 to P45 are taken as the area brightness values of the areas A11 to A45 in correspondence.

Reference is made back to FIG. 2. In operation S240, determining whether each of the patch brightness values is within a target brightness value range. In some embodiments, operation S240 is performed by the processor 130 as illustrated in FIG. 1. When the patch brightness value is not within the target brightness value range, operation S245 is performed. On the other hand, when the patch brightness value is within the target brightness value range, operation S280 is performed.

In some embodiments, the target brightness value range includes an upper limit and a lower limit. The patch brightness values that are higher than the upper limit or not higher than the lower limit are determined to be not within the target brightness value range.

In operation S245, gradient values of the patches are calculated. In some embodiments, operation S245 is performed by the processor 130 as illustrated in FIG. 1.

For example, reference is made to FIG. 2 and FIG. 3 together. In some embodiments, the processor 130 determines that the patch brightness value of the patch P32 is not within the target brightness value range in operation S240. When it is determined that the patch brightness value of the patch P32 is not within the target brightness value range, the processor 130 further calculates the gradient value of the patch P32.

The following takes patch P32 as illustrated in FIG. 3 as an example for illustrative purposes. The operations to other patches are similar to the operations to the patch P32.

In operation S250, it is determined whether each of the gradient values of the patches is higher than a gradient value threshold. In some embodiments, the operation S250 is performed by the processor 130. When the gradient value of the patch is higher than the gradient value threshold, operation S260 is performed. On the other hand, when the gradient value of the patch is not higher than the gradient value threshold, operation S280 is performed.

In operation S260, a corresponding area is obtained by expanding the patch, and an area brightness value of the area corresponding to the patch is adjusted, so that an adjusted patch brightness value of the patch is within the target patch brightness value range. In some embodiments, operation S260 is performed by the processor 130 as illustrated in FIG. 1.

Reference is made to FIG. 3 together. For example, in some embodiments, the patch brightness value of the patch P32 is not within the target patch brightness value range and the gradient value of the patch p32 is higher than the gradient value threshold, the processor 130 as illustrated in FIG. 1 expands patch P32 to obtain an area A32 is correspondence, and then the processor 130 adjust the area brightness value of the area A32.

In some other embodiments, the processor 130 does not expand the patch P32 and only adjusts the patch brightness value of the patch P32.

In some embodiments, when the patch brightness value of the patch P32 is not higher than the lower limit of the target brightness value range, the processor 130 enhances the area brightness value of the area A32. On the other hand, when the patch brightness value of the patch P32 is higher than the upper limit of the target brightness value range, the processor 130 reduces the area brightness value of the area A32.

Figure 4B:
FIG. 4B is a schematic diagram illustrating an adjusted area according to some embodiments of the present disclosure.
Figure 4A:
FIG. 4A is a schematic diagram illustrating an area to be adjusted according to some embodiments of the present disclosure.

Reference is made to FIG. 4A and FIG. 4B together. FIG. 4A is a schematic diagram illustrating the area A32 to be adjusted according to some embodiments of the present disclosure. FIG. 4B is a schematic diagram illustrating an adjusted area A32A according to some embodiments of the present disclosure.

In an embodiment, the processor 130 retrieves the area A32 corresponding to the patch P32 from the original image IMGA as illustrated in FIG. 3. After adjusting the area brightness value of the area A32, the processor 130 generates the adjusted area A32A as illustrated in FIG. 4B.

In some embodiments, after adjusting the area brightness value of the area A32 and the adjusted area A32A is generated, the processor 130 calculates an adjusted patch brightness value of the adjusted patch area P32A to ensure that after adjustment, the adjusted patch brightness value of the adjusted patch are P32A is within the target brightness value range.

In some other embodiments, the adjusted patch brightness value of the adjusted patch area P32A is taken as an adjusted area brightness value of the adjusted area A32.

In some embodiments, the processor 130 adjusts the area brightness value of the area A32 according to a brightness value histogram of the area A32. However, any methods for adjusting the brightness value of an image are within the embodiments of the present disclosure.

Figure 5B:
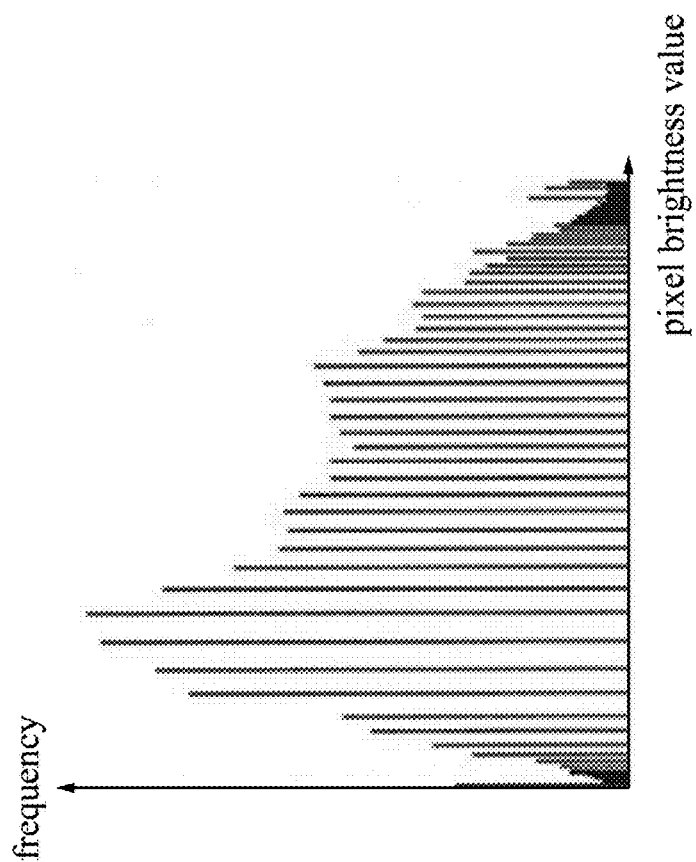
FIG. 5B is a schematic diagram illustrating a brightness value histogram of an area after adjustment.
Figure 5A:
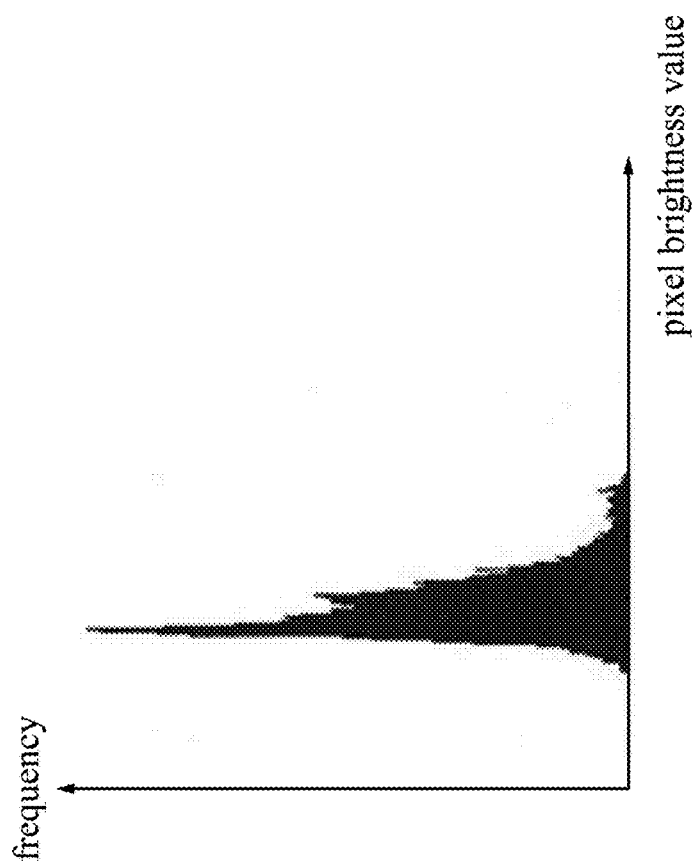
FIG. 5A is a schematic diagram illustrating a brightness value histogram of an area before adjustment.

Reference is made to FIG. 5A and FIG. 5B. FIG. 5A is a schematic diagram illustrating a brightness value histogram 500A of an area before adjustment. FIG. 5B is a schematic diagram illustrating a brightness value histogram 500B of an area after adjustment.

In some embodiments, the brightness value histogram 500A is a brightness value histogram of the area A32 in FIG. 4A, and the brightness value histogram 500B is a brightness value histogram of the adjusted area A32A in FIG. 4B.

As illustrated in FIG. 5A, most of the brightness value falls on lower brightness values, which causes the patch brightness value of the patch P32 corresponding to the area A32 to be not higher than the lower limit of the target brightness value range. After adjusting the area brightness value of the area A32 by equalizing the pixel brightness values of the area A32, since the pixel brightness values of the adjusted area A32A are relatively average between different brightness values, the patch brightness value of the adjusted patch P32A corresponding to the adjusted area A32A is higher.

The area brightness value of the adjusted area A32A is higher than the area brightness value of the area A32 after adjusting the area brightness value of the area A32 by equalizing the pixel brightness values of the area A32, and the contrast value or the gradient value of the adjusted area A32A is higher.

In operation S270, the adjusted area is applied to the image to obtain an adjusted image. In some embodiments, operation S270 is performed by the processor 130 in FIG. 1.

Figure 6:
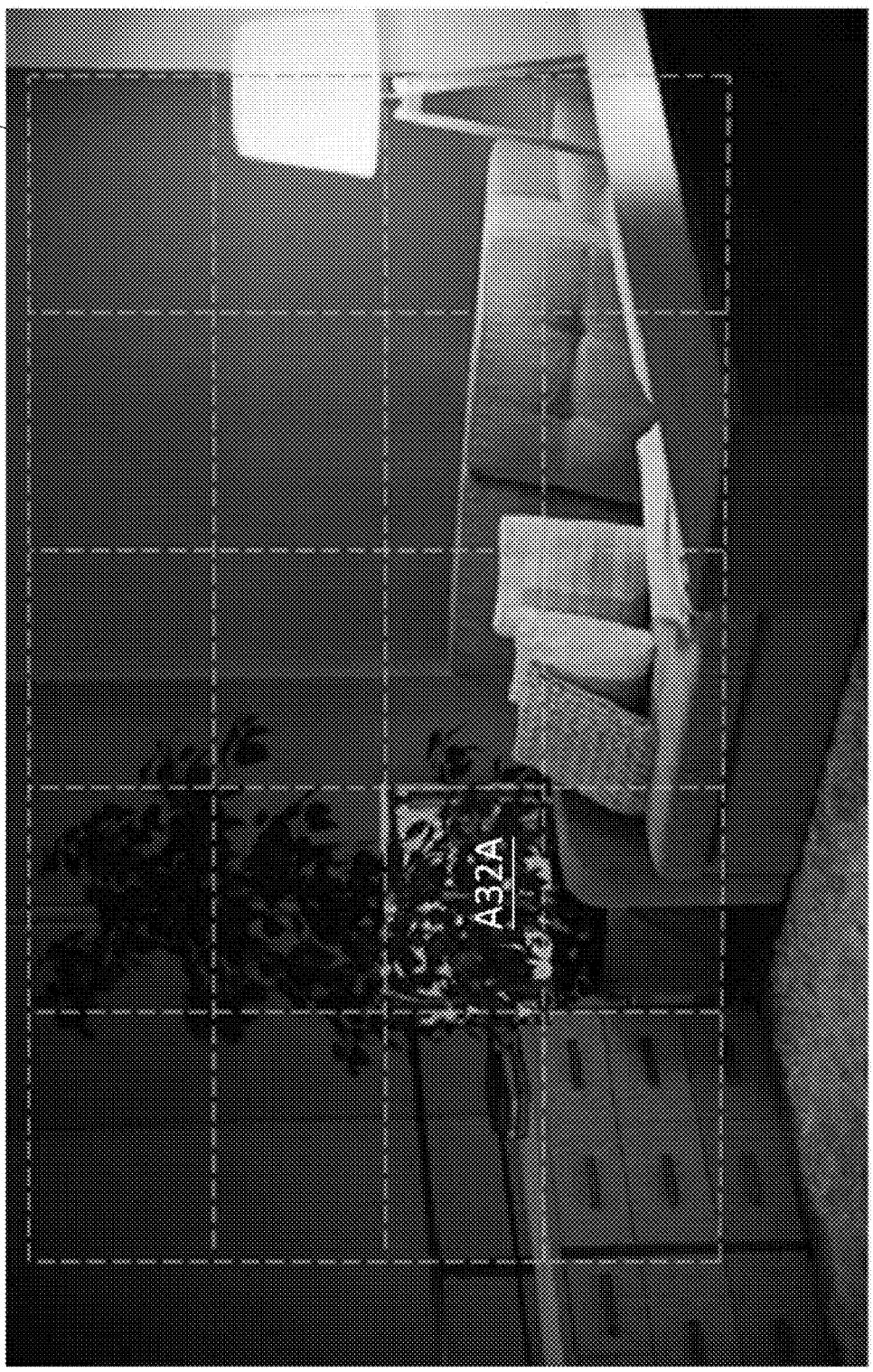
FIG. 6 is a schematic diagram illustrating an operation of the image adjusting method according to some embodiments of the present disclosure.

For example, in some embodiments, the processor 130 replaces the area A32 of the image IMGA with the adjusted area A32A as illustrated in FIG. 4B, and the processor 130 generates the adjusted image IMGB as illustrated in FIG. 6.

In the embodiment of the adjusted image IMGB, only area A32 is replaced with the adjusted area A32A. However, other areas whose patch brightness value is not within the target brightness value range and the patch gradient value is higher than a gradient value threshold are also replaced by the adjusted areas.

Reference is made to FIG. 3 again. In an embodiment, the patch brightness values of the patches P11, P12, P13, P21, P22, P25, P31, P32, and P42 are not within the target value range while the other patches are within the target value range. Moreover, within the patches P11, P12, P13, P21, P22, P25, P31, P32, P42, the gradient values of the patches P12, P22, P32 and P42 are higher than the gradient value threshold. Then, only the areas A12, A22, A32 and A42 corresponding to the patches P12, P22, P32 and P42 are adjusted and replaced with the adjusted areas in correspondence.

Figure 7:
FIG. 7 is a schematic diagram illustrating an adjusted image according to some embodiments of the present disclosure.

As illustrated in FIG. 7, after replacing the areas A12, A22, A32 and A42 with the adjusted areas A12A, A22A, A32A and A42A, the adjusted image IMGC is generated.

Reference is made to FIG. 2 again. In operation S280, the original brightness value is kept. For example, reference is made to FIG. 3 again. The patch brightness values of the patches P14, P15, P23, P24, P33, P34, P35, P41, P43, P44, and P45 are within the target value range. The patch brightness values of the patches P11, P13, P21, P25, and P31 are not within the target value range but the gradient values of the patches P11, P13, P21, P25, and P31 are not higher than the gradient value threshold. For these patches P14, P15, P23, P24, P33, P34, P35, P41, P43, P44, P45 and P11, P13, P21, P25, P31 the patch brightness values is unchanged and is kept. Also, for the areas A14, A15, A23, A24, A33, A34, A35, A41, A43, A44, A45 and A11, A13, A21, A25, A31 corresponding to the patches P14, P15, P23, P24, P33, P34, P35, P41, P43, P44, P45 and P11, P13, P21, P25, P31, the area brightness values is unchanged and is kept.

Reference is made to FIG. 2 again. In operation S290, several features are extracted according to the adjusted image. In some embodiments, the processor 130 as illustrated in FIG. 1 extracted several features according to the image IMGC as illustrated in FIG. 7. The method of feature extraction will not be described in detail here. If none of the brightness values are adjusted in operation S260, in operation S290, the features are extracted according to the original image captured in operation S210.

As illustrated in FIG. 7, since the brightness value of the areas including the tree is adjusted to be higher, the features of the tree can be extracted more accurately.

Through the operations of various embodiments described above, an image adjusting method, an electronic device, and a non-transitory computer readable storage medium are implemented, according to the patch brightness values of the patches of the image, the patches that are too bright or too dark or undistinguishable for extracting features are distinguished and selected. By adjusting the selected patches, the area brightness values of the areas corresponding to the selected patches adjusted independently. After adjusting the areas corresponding to the selected patches independently, the brightness values of the adjusted areas are all within the target brightness value range. While the brightness value of an area is adjusted, the contrast of the area is higher, and more features can be extracted, which increase the quality of the SLAM system. Also, for areas that are originally within the target brightness value range, no adjustment to the brightness value is applied, and these areas will not be affected.

Furthermore, since the areas with higher gradient values includes higher contrast and is more likely to include more features, by selecting and adjusting the areas whose corresponding gradient value is higher and not adjusting the areas whose corresponding gradient value is not higher, the processing time and processing load can be decreased.

For an uneven light condition environment, the embodiments of the present disclosure can adjust the areas of the captured image indecently, so that more features can be extracted from the captured image.

In addition, it should be noted that in the operations of the abovementioned image adjusting method 200, no particular sequence is required unless otherwise specified. Moreover, the operations may also be performed simultaneously or the execution times thereof may at least partially overlap.

Furthermore, the operations of the image adjusting method 200 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processing circuits and coded instructions), which will typically include transistors or other circuit elements that are configured in such a way as to control the operation of the circuitry in accordance with the functions and operations described herein.

Although the present disclosure has been described in considerable detail with reference to certain embodiments thereof, other embodiments are possible. Therefore, the scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image adjusting method, suitable for an electronic device, wherein the image adjusting method comprises:
   calculating a plurality of patch brightness values of a plurality of patches of an image;
   determining whether a first gradient value of a first patch of the plurality of patches is higher than a gradient value threshold when a first patch brightness value of the first patch is not within a target brightness value range;
   adjusting the first patch brightness value of the first patch to generate a first adjusted patch when the first patch brightness value of the first patch is not within all the target brightness value range and the first gradient value of the first patch is higher than the gradient value threshold, so that a first adjusted patch brightness value of the first adjusted patch is within the target brightness value range; and
   replacing the first patch of the image with the first adjusted patch to obtain an adjusted image.

2. The image adjusting method of claim 1, further comprising:
   extracting a plurality of features according to the adjusted image.

3. The image adjusting method of claim 1, further comprising:
   expanding the first patch to obtain a first area;
   adjusting a first area brightness value of the first area to generate a first adjusted area when the first patch brightness value of the first patch is not within the target brightness value range; and
   replacing the first area of the image with the first adjusted area to obtain the adjusted image.

4. The image adjusting method of claim 3, wherein the first area comprises the first patch and the first area is larger than the first patch.

5. The image adjusting method of claim 1, further comprising:
   expanding the first patch to obtain a first area;
   adjusting a first area brightness value of the first area corresponding to the first patch to generate a first adjusted area when the first patch brightness value of the first patch is not within the target brightness value range and the first gradient value of the first patch is higher than the gradient value threshold, so that the first adjusted patch brightness value is within the target brightness value range; and replacing the first area of the image with the first adjusted area to obtain the adjusted image.

6. The image adjusting method of claim 1, further comprising:

keeping the first patch brightness value of the first patch of the plurality of patches when the first patch brightness value of the first patch is not within the target brightness value range and the first gradient value of the first patch is not higher than the gradient value threshold.

7. An electronic device, comprising:

a camera, configured to capture an image of a real space; and a processor, coupled to the camera, wherein the processor is configured to:

calculate a plurality of patch brightness values of a plurality of patches of the image;

determine whether a first gradient value of a first patch of the plurality of patches is higher than a gradient value threshold when a first patch brightness value of the first patch is not within a target brightness value range;

adjust the first patch brightness value of the first patch of the to generate a first adjusted patch when the first patch brightness value of the first patch is not within the target brightness value range and the first gradient value of the first patch is higher than the gradient value threshold, so that a first adjusted patch brightness value of the first adjusted patch is within the target brightness value range; and replace the first patch of the image with the first adjusted patch to obtain an adjusted image.

8. The electronic device of claim 7, wherein the processor is further configured to:

extracting a plurality of features according to the adjusted image.

9. The electronic device of claim 7, wherein the processor is further configured to:

expand the first patch to obtain a first area;

adjust a first area brightness value of the first area to generate a first adjusted area when the first patch brightness value of the first patch is not within the target brightness value range; and replace the first area of the image with the first adjusted area to obtain the adjusted image.

10. The electronic device of claim 9, wherein the first area comprises the first patch and the first area is larger than the first patch.

11. The electronic device of claim 7, wherein the processor is further configured to:

expand the first patch to obtain a first area;

adjust a first area brightness value of the first area corresponding to the first patch to generate a first adjusted area when the first patch brightness value of the first patch is not within the target brightness value range and the first gradient value of the first patch is higher than the gradient value threshold, so that the first adjusted patch brightness value is within the target brightness value range; and replace the first area of the image with the first adjusted area to obtain the adjusted image.

12. The electronic device of claim 7, wherein the processor is further configured to:

keep the first patch brightness value of the first patch of the plurality of patches when the first patch brightness value of the first patch is not within the target brightness value range and the first gradient value of the first patch is not higher than the gradient value threshold.

13. A non-transitory computer readable storage medium, wherein the non-transitory computer readable storage medium comprises one or more computer programs stored therein, and the one or more computer programs can be executed by one or more processors so as to be configured to operate an image adjusting method, wherein the image adjusting method comprises:

calculating a plurality of patch brightness values of a plurality of patches of an image;

determining whether a first gradient value of a first patch of the plurality of patches is higher than a gradient value threshold when a first patch brightness value of the first patch is not within a target brightness value range;

adjusting the first patch brightness value of the first patch to generate a first adjusted patch when the first patch brightness value of the first patch is not within the target brightness value range and the first gradient value of the first patch is higher than the gradient value threshold, so that a first adjusted patch brightness value of the first adjusted patch is within the target brightness value range; and replacing the first patch of the image with the first adjusted patch to obtain an adjusted image.

14. The non-transitory computer readable storage medium of claim 13, wherein the image adjusting method further comprises:

extracting a plurality of features according to the adjusted image.

15. The non-transitory computer readable storage medium of claim 13, wherein the image adjusting method further comprises:

expanding the first patch to obtain a first area;

adjusting a first area brightness value of the first area to generate a first adjusted area when the first patch brightness value of the first patch is not within the target brightness value range; and replacing the first area of the image with the first adjusted area to obtain the adjusted image;

wherein the first area comprises the first patch and the first area is larger than the first patch.

16. The non-transitory computer readable storage medium of claim 13, wherein the image adjusting method further comprises:

expanding the first patch to obtain a first area;

adjusting a first area brightness value of the first area corresponding to the first patch to generate a first adjusted area when the first patch brightness value of the first patch is not within the target brightness value range and the first gradient value of the first patch is higher than the gradient value threshold, so that the first adjusted patch brightness value is within the target brightness value range; and replacing the first area of the image with the first adjusted area to obtain the adjusted image.

17. The non-transitory computer readable storage medium of claim 13, wherein the image adjusting method further comprises:

keeping the first patch brightness value of the first patch of the plurality of patches when the first patch brightness value of the first patch is not within the target brightness value range and the first gradient value of the first patch is not higher than the gradient value threshold.

* * * * *